(12) United States Patent
Fukabori

(10) Patent No.: US 6,253,683 B1
(45) Date of Patent: Jul. 3, 2001

(54) AIR BAG GAS INFLATOR

(75) Inventor: Mitsuhiko Fukabori, Hyogo (JP)

(73) Assignee: Daicel Chemical Industries, Ltd., Osaka (JP)

( * ) Notice: Subject to any disclaimer, the term of this patent is extended or adjusted under 35 U.S.C. 154(b) by 0 days.

(21) Appl. No.: 09/135,003

(22) Filed: Aug. 17, 1998

(51) Int. Cl.⁷ .................................................... B60R 21/26
(52) U.S. Cl. ............................ 102/530; 280/737; 280/741
(58) Field of Search .................................. 102/530, 531; 280/737, 741

(56) References Cited

U.S. PATENT DOCUMENTS

| 5,219,178 | * | 6/1993 | Kobari et al. | |
|---|---|---|---|---|
| 5,516,147 | * | 5/1996 | Clark et al. | 280/737 |
| 5,533,751 | * | 7/1996 | Kort et al. | 280/737 |
| 5,582,428 | * | 12/1996 | Buchanan et al. | 280/471 |
| 5,630,619 | * | 5/1997 | Buchanan et al. | 280/741 |
| 5,709,406 | * | 1/1998 | Buchanan | 280/737 |
| 5,794,973 | * | 8/1998 | O'Loughlin et al. | 280/737 |

OTHER PUBLICATIONS

Research Disclosure, Apr. 1998, The Int. Journal for Co.'s seekin an alternative or supp. to obtaining patents, p. 361.*

* cited by examiner

*Primary Examiner*—Michael J. Carone

(57) ABSTRACT

A gas generator for an air bag that can change deployment pattern of the air bag is provided. The gas generator includes two gas generating units connected in the axial direction, each of the gas generating units including a cylindrical housing, an igniter disposed in the cylindrical housing and operates upon receiving an operation signal, a gas generating agent ignited by the igniter to generate a combustion gas, a pressurized gas sealed within the housing and heated by the combustion gas of the gas generating agent to generate a mixture gas together with the combustion gas, and a gas exhaust outlet disposed at one side end of the housing and from which the mixture gas within the housing is injected. The two gas generating units are joined by welding one end of each of the housings of the gas generating units together.

4 Claims, 1 Drawing Sheet

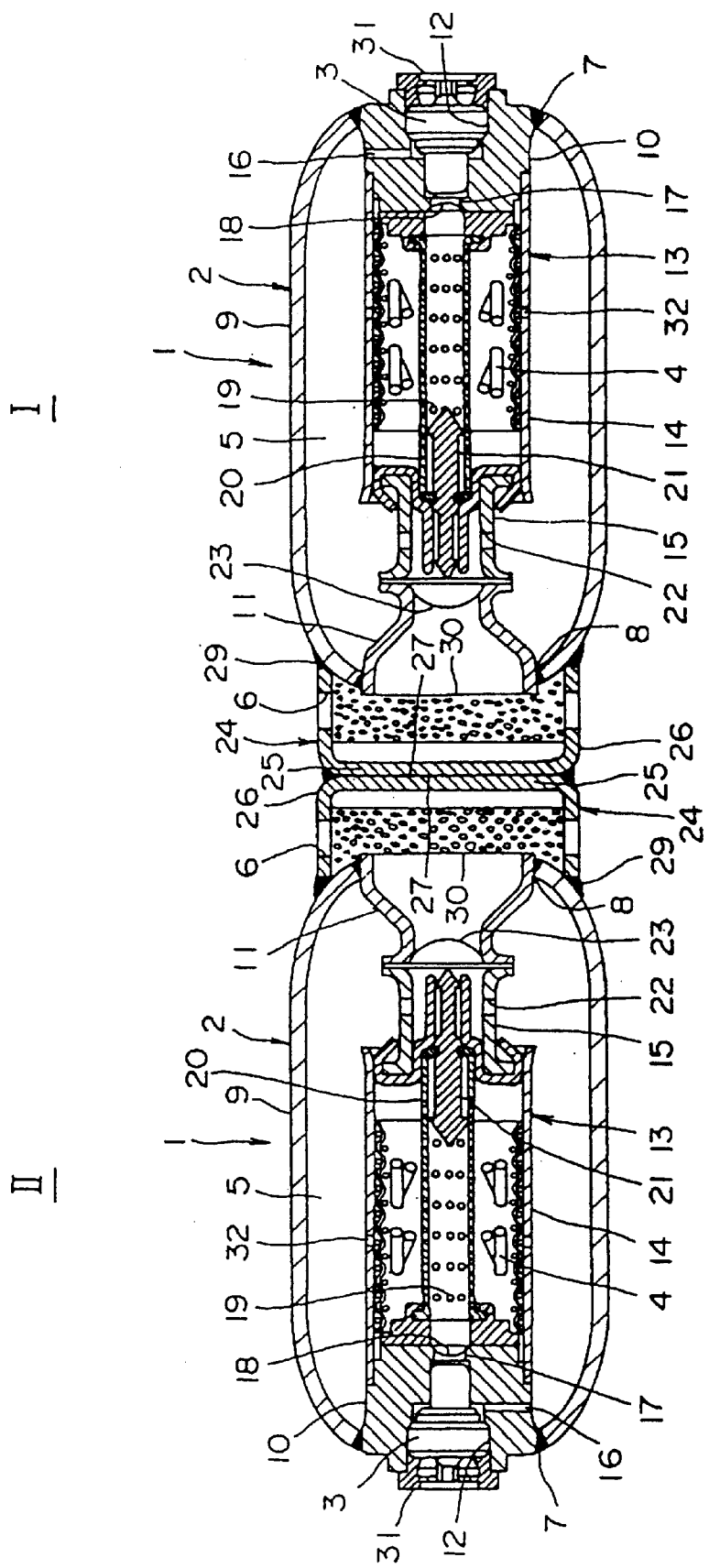

AIR BAG GAS INFLATOR

BACKGROUND OF THE INVENTION

Field of the Invention

The present invention relates to a gas generator for an air bag that protects a driver or a passenger from an impact, and more particularly to a hybrid-type gas generator that seals pressurized gas therein.

DESCRIPTION OF THE PRIOR ART

For the purpose of protecting a driver or a passenger from an impact of a vehicle collision, a vehicle is equipped with an air bag device. The air bag device includes a sensor, a control unit, gas generator, an air bag, etc. The gas generator includes an igniter and gas generating means. In the hybrid-type gas generator, the gas generating means includes a gas generating agent and a pressurized gas.

Upon detection of an impact by the sensor, a detection signal is supplied to the control unit, which conducts arithmetic operation in response to the detection signal. The control unit generates an output signal representative of the result of the arithmetic operation to the igniter. The igniter is thus operated. With this operation, the gas generating agent of the gas generating means is burned to generate a gas having a high temperature and a high pressure. The combustion gas heats the pressurized gas and mixes with the pressurized gas, and the mixed gas is injected into the air bag (bag body). As a result, the air bag is inflated to form a cushion that absorbs an impact between a solid structure and the driver or passenger.

Because of the rapid combustion of the gas generating agent, the mixed gas generated by the combustion inflates the air bag rapidly. The rapid inflation of the air bag may apply a sudden and large impact to a small child when he or she is not in a regular seating posture.

SUMMARY OF THE INVENTION

Therefore, an object of the present invention is to provide a gas generator for an air bag which can change the inflation pattern of the air bag in accordance with circumstances.

There is provided a gas generator for an air bag of the present invention including two gas generating units being connected axially, each of said gas generating units, comprising: a cylindrical housing; an igniter disposed in one end of said cylindrical housing and operates upon receiving an operation signal; a gas generating agent ignited by the igniter to generate a combustion gas; a pressurized gas sealed within the housing and heated by the combustion gas of the gas generating agent to generate a mixture gas together with the combustion gas; and a diffuser having a gas exhaust outlet disposed at the other end of the housing and from which the mixture gas within the housing is exhausted, wherein the two gas generating units are joined together at the diffuser sides of the housings of the respective gas generating units by welding.

Also, it is preferable that each of the diffusers of the gas generating units are made of a cylindrical member including an end wall portion having a joint surface and a peripheral wall portion having the gas exhaust outlet.

Further, these two gas generating units may have the same structure.

Still further, both of the amount of the gas generating agent and the volume of the pressurized gas or either of them may be different between the two gas generating units.

The gas generator for an air bag is so arranged that two gas generating units are connected to each other in their axial direction. Each of the two gas generating units includes the cylindrical housing, the igniters, the gas generating means, that is, the gas generating agent and the pressurized gas, and the gas exhaust outlet. Those two gas generating units are joined together by welding the respective other ends together at which the respective gas exhaust outlets are defined.

The gas generator of the present invention can change an inflating (deploying) rate of the air bag by operating the two igniter at the same time or with a time lag.

When the degree of an impact is small, two igniters operate with a time lag, thereby decreasing the inflating rate of the air bag at an initial state of deployment. As a result, a small force is applied to a driver or a passenger who is not at a regular seating posture, and a large force is thereafter applied so that he returns to the regular seating posture. Thus, a cushion can be formed in front of the driver or the passenger.

Moreover, when the degree of an impact is large, two igniters operate simultaneously, thereby increasing the inflating rate of the air bag. As a result, the air bag is inflated rapidly, thereby forming a cushion in front of the driver or the passenger.

Furthermore, in the gas generator of the present invention, when only one of two igniters operate, the amount of gas supplied to the air bag can be reduced.

For example, when a room temperature of the vehicle is high, the air bag is inflated by an excessive internal pressure. In such a case, only one igniter operates so that one of two gas generating units operates, thereby reducing the amount of gas supplied to the air bag. By operating the gas generating unit in this matter, the air bag can be inflated with an appropriate internal pressure.

The igniter may be disposed at the one end of the housing opposite to the gas exhaust outlet or at the other end of the housing that is at the same side as the gas exhaust outlet.

The joining of two gas generating units can be conducted by a variety of welding techniques, for example, gas welding, arc welding, inert gas arc welding, friction welding, etc. It is preferable that the end of the housing to which welding is conducted is made of a cylindrical member including an end wall portion having a joint surface and a peripheral wall portion having the gas exhaust outlet. Those two generating units are put together on the above-mentioned joint surfaces to be welded.

The pressurized gas provided in the gas generator of the present invention may be an inert gas, such as argon, helium, or the like.

As stated in the foregoing, according to the present invention, a gas generator for an air bag capable of changing deployment patterns of the air bag is realized. In other words, the gas generator of the present invention can vary gas providing speed and gas providing amount by controlling the operation of the igniters, thereby changing the deployment patterns of the air bag.

Further, since, in the gas generator of the present invention, the gas exhaust outlet is provided in the center portion of the gas generator assembly, an even deployment of the air bag can be achieved resulting in a safe protection of the driver/passenger.

BRIEF DESCRIPTION OF THE DRAWINGS

FIG. 1 is a cross-sectional view showing a gas generator for an air bag according to an embodiment of the present invention.

DESCRIPTION OF THE PREFERRED EMBODIMENTS OF THE INVENTION

Now, a description will be given in more detail of an embodiment of the present invention.

FIG. 1 is a cross-sectional view showing a gas generator for an air bag in accordance with an embodiment of the present invention. The gas generator includes two gas generating units 1 connected to each other in an axial direction. These two gas generating units 1 are of the same structure. Each of these two gas generating units 1 includes a cylindrical housing 2, an ignition unit disposed at one end of the housing 2, that is, an electronic igniter 3, a gas generating agent 4, which is ignited by the igniter 3 to generate combustion gas, a pressurized gas 5 sealed in the housing 2 to generate a mixture gas with the combustion gas of the gas generating agent, and a gas exhaust outlet 6, which is disposed in the other end of the housing 2, for injecting the mixture gas.

The housing 2 includes a cylindrical body 9 having openings 7 and 8 on both ends thereof. An assembly 13 is disposed within the body 9 and includes an adaptor portion 10, a cylindrical portion 14, a cup-shaped portion 11, and a connection portion 15 that connects the cup-shaped portion 11 to the cylindrical portion 14. After being inserted into the body 9 from the opening 7, the assembly 13 is air-tightly fixed by welding on the respective openings in the state where the opening edge portion of the cup-shaped portion 11 is inserted in the opening 8 while the outer peripheral portion of the adaptor portion 10 is inserted in the opening 7.

The adaptor portion 10 includes a hole portion 12, in which the igniter 3 is disposed, a through-hole 17 disposed on the bottom portion of the hole portion 12, and a filling hole 16, which is filled with the pressurized gas. The igniter 3, after being disposed in the hole portion 12, is fixed by a screw bolt 31. Also, a burst disc 18 is disposed in the through-hole 17. The cylindrical portion 14 has a through-hole 32 in the substantially center portion in a thereof longitudinal direction, and a fire transmission tube 20 having a large number of through-holes 19 is disposed centrally inside of the cylindrical portion. Within the fire transmission tube 20, a check valve 21 is slidably disposed. The gas generating agent 4 is disposed in an annular space defined by the fire transmission tube 20 and the cylindrical portion 14. The connection portion 15 has a through-hole 22, and a burst disc 23 is disposed between the connection portion 15 and the cup-shaped portion 11.

The pressurized gas 5, filled through the filling hole 16, is also drawn into the cylindrical portion 14 through the through-hole 32.

One end of the housing 2 is made of a cylindrical member 24. The cylindrical member 24 includes an end wall portion 25, a peripheral wall portion 26, and an open end portion 29. The open end portion 29 surrounds the opening 8 of the body and fixed around the opening 8 by welding. The end wall portion 25 has a plane junction surface 27, and a plurality of gas exhaust outlets 6 are disposed circumferentially on the peripheral wall portion 26. A filter 30, also serving as a coolant, is disposed inside of the cylindrical member 24.

The two gas generating units are joined to each other by welding on one end portion of the housings for the respective gas generating units, that is, on the cylindrical members 24. In other words, those two gas generating units are placed together such that the respective joint surfaces 27 of the cylindrical members 24 are facing each other, and welded in this state to be joined to each other. With this structure, the gas exhaust outlet 6 is positioned in the center portion of the gas generator of the present invention.

Hereinafter, the operation of the gas generator according to the present invention will be described. Initially, the operation of one of the gas generating units 1 that form the gas generator will be described, and then the operation of the gas generator according to the present invention will be described.

In the gas generating unit 1, upon sensing an impact by a sensor (not shown), a detection signal is sent from the sensor to a control unit (not shown) that conducts an arithmetic calculation on the basis of the detection signal to generate an output signal representative of the result of the arithmetic calculation to the igniter 3. In response to the output signal, the igniter 3 operates to generate a gas having a high temperature and a high pressure. The pressure of the gas thus generated ruptures the burst disc 18, to thereby inject a high-temperature gas into the fire transmission tube 20. The injected gas passes through the through-hole 19 of the fire transmission tube and ignites the gas generating agent 4 outside the fire transmission tube. As a result, the gas generating agent 4 is burned to generate a combustion gas. The pressure of the combustion gas moves the check valve 21, and with this movement, the burst disc 23 is ruptured. In this operation, the pressurized gas 5 sealed within the housing 2 passes through the through-hole 22 and is inserted into the connection portion 15 before being injected from the gas exhaust outlet 6 through the cup-shaped portion 11 and the filter 30. The air bag (not shown) containing the injected gas therein is inflated at a relatively low rate.

The combustion gas is also injected from the through-hole 32 and mixed with the pressure gas 5 outside of the cylindrical portion 14. The combustion gas also heats the pressure gas 5. The mixture gas consisting of the pressure gas 5 which is inflated by heating and the combustion gas of the gas generating agent 4 is inserted into the connection portion 15 through the through-hole 22 and passes through the filter 30 after passing the cap-shaped portion 11 so that it is cooled and cleaned while passing through the filter 30. The mixture gas thus cooled and cleaned is injected from the gas exhaust outlet 6. The air bag receiving the injected gas therein is inflated at a large inflating rate.

The gas generator of the present invention can operate as follows, with the control of the operation of the igniter 3. For simplification of explanation, a part of the gas generating unit at the right side of the drawing is called "first" whereas a part of the gas generation unit at the left side thereof is called "second."

(i) When the degree of an impact is small, two igniters 3 are operated with a time lag.

The first igniter 3 is initially operated in accordance with an electric signal from the control unit (not shown). As a result, as described above, the first burst disc 18 is ruptured so that the first gas generator 4 is ignited, thereby burning the first gas generating agent 4 to generate the combustion gas. The pressure of the combustion gas moves the first check valve 21 to rupture the first burst disc 23. In this operation, the first pressure gas 5 is injected from the first gas exhaust outlet into the air bag (not shown) after passing through the first through-hole 22 and the first filter 30. The air bag is inflated at a relatively low rate.

At a predetermined time t after the first igniter 3 is operated, an electric signal is supplied from the control unit to the second igniter 3, to thereby operate the second igniter 3. As a result, the second gas generating unit 1 operates in the same manner as that of the first gas generating unit 1, and the second pressurized gas 5 is supplied from the second gas exhaust outlet 6 into the air bag. Thereafter, because the amount of gas supplied from the second gas generating unit 1 into the air bag is added to the amount of gas supplied from the first gas generating unit 1 thereinto, the inflating rate of the air bag is increased.

In the above-mentioned manner, in the gas generator of the present invention, the air bag is initially inflated at a small inflating rate so that a small force is applied to the driver or the passenger who may not be in the regular seating posture, and thereafter the air bag is inflated at a large inflating rate so that a large force is applied to the driver or the passenger, who is not in the regular seating posture whereby moving him to the regular seating posture. Thus, a cushion can be formed in front of the driver or the passenger.

(ii) When the degree of the impact is large, two igniters 3 are operated simultaneously.

The first igniter 3 and the second igniter 3 are operated simultaneously in accordance with an electric signal from the control unit. As a result, the first and second pressurized gases 5 are initially injected and then the first and second mixture gases are injected from the first and second gas exhaust outlets 6 into the air bag. As a result, the air bag is inflated by the gases from two gas generating units that operate simultaneously as to rapidly inflate the air bag such that the air bag forms a cushion in front of the driver or the passenger to be protected.

What is claimed:

1. A gas generator for an air bag including two gas generating units being connected in an axial direction, each of said gas generating units comprising:

a cylindrical housing;

ignition means disposed in said cylindrical housing and operates upon receiving an operation signal;

a gas generating agent ignited by said ignition means to generate a combustion gas;

a pressurized gas sealed within said housing and heated by the combustion gas of said gas generating agent to generate a mixture gas together with said combustion gas; and a diffuser having a gas exhaust outlet disposed at one end of said housing and from which said mixture gas in said housing is injected, said diffuser having a flat end wall portion, wherein said two gas generating units are joined by adjoining flat end wall portion of each of the gas generating units together and welding said diffuser of each of said gas generating units together.

2. A gas generator for an air bag as claimed in claim 1, wherein said diffuser includes a cylindrical member including an end wall portion having a joint surface, and a peripheral wall portion having the gas exhaust outlet.

3. A gas generator for an air bag as claimed in claim 1, wherein said two gas generating units have the same structure.

4. A gas generator for an air bag as claimed in claim 1, wherein an amount of at least one of the gas generating agent and the pressurized gas in one of the two gas generating units is different from the other of said two gas generating units.

* * * * *